United States Patent
Mitchell et al.

(10) Patent No.: US 10,976,754 B2
(45) Date of Patent: Apr. 13, 2021

(54) METHOD OF AUTOMATICALLY CONTROLLING A VOLUME OF MATERIAL DISPENSED IN A CONSTANT PRESSURE MATERIAL DISPENSING SYSTEM

(71) Applicants: Michael D Mitchell, Madison Heights, MI (US); Phillip M Markison, Marengo, IL (US); John Macdonald, White Lake, MI (US); Michael M Zupancic, Livonia, MI (US)

(72) Inventors: Michael D Mitchell, Madison Heights, MI (US); Phillip M Markison, Marengo, IL (US); John Macdonald, White Lake, MI (US); Michael M Zupancic, Livonia, MI (US)

(73) Assignee: FCA US LLC, Auburn Hills, MI (US)

( * ) Notice: Subject to any disclaimer, the term of this patent is extended or adjusted under 35 U.S.C. 154(b) by 151 days.

(21) Appl. No.: 16/126,508

(22) Filed: Sep. 10, 2018

(65) Prior Publication Data
US 2020/0081458 A1    Mar. 12, 2020

(51) Int. Cl.
*G05D 7/06*      (2006.01)
*G01F 15/00*     (2006.01)
*B05C 11/10*     (2006.01)
*G01F 25/00*     (2006.01)

(52) U.S. Cl.
CPC ......... *G05D 7/0623* (2013.01); *G01F 15/005* (2013.01); *B05C 11/1002* (2013.01); *G01F 25/0092* (2013.01)

(58) Field of Classification Search
CPC ... B05C 11/1002; B05C 11/1013; B05C 5/02; B05C 5/0225; G01F 25/0092; G01F 15/005; B01F 15/042; G01G 11/08; G05D 7/0623; G05D 11/003; G05D 7/0635; G05D 7/0641; G05D 7/0647; G05D 7/0652; G05D 7/0658; G05D 7/0664; Y10T 137/2521; B29B 7/603; B27B 7/72
USPC ................................ 222/145.7, 55, 1, 57, 61
See application file for complete search history.

(56) References Cited

U.S. PATENT DOCUMENTS

| | | | | |
|---|---|---|---|---|
| 5,038,971 A * | 8/1991 | Gayer | .................... | B67D 7/744 222/1 |
| 6,824,012 B2 * | 11/2004 | Werner | ............. | B01F 15/00253 222/1 |
| 6,923,568 B2 * | 8/2005 | Wilmer | ................. | B01F 5/0451 366/152.1 |

* cited by examiner

*Primary Examiner* — Vishal Pancholi
*Assistant Examiner* — Robert K Nichols, II
(74) *Attorney, Agent, or Firm* — Ralph E Smith

(57) ABSTRACT

A method of a method of controlling a volume of material dispensed by a constant pressure adhesive and sealant dispensing system controlled by a controller during shots includes automatically adjusting a proportional valve control setting for an orifice size of a controlled pressure regulator. An orifice size control pressure corresponding to the proportional valve control setting is applied to an orifice size control inlet of the controlled pressure regulator. A volume of the material dispensed during each shot is monitored and when the volume of material dispensed during each shot of a predetermined number of successive shots is outside a target range, the proportional valve control setting is automatically adjusted by the controller.

6 Claims, 2 Drawing Sheets

METHOD OF AUTOMATICALLY CONTROLLING A VOLUME OF MATERIAL DISPENSED IN A CONSTANT PRESSURE MATERIAL DISPENSING SYSTEM

FIELD

The present invention relates to a method of automatically controlling a volume of material dispensed during shots by a constant pressure adhesive and sealant dispensing system by automatically adjusting a proportional valve control setting to provide a more consistent volume of material dispensed from shot to shot.

BACKGROUND

A constant pressure dispensing system is used to apply a one part adhesive or a one part sealant to desired components of an assembly, such as to a body-in-white of an automotive vehicle, during the assembly process. The material being dispensed is pumped by a pump through a controlled pressure regulator to a dispensing gun which may be mounted on a robotic arm or may be mounted on a pedestal. The system is referred to as a constant pressure dispensing system since there is always pressure at the inlet of the controlled pressure regulator, although this pressure can vary and need not always be the same. The size of an opening in an orifice in the controlled pressure regulator is set to control a volume of the material being dispensed during a shot when it is applied to components of the assembly. As used herein, a "shot" is the dispensing of one application of material by the constant pressure dispensing system.

FIG. 1 is a basic block diagram of an example of such a constant pressure dispensing system 100 available from the Nordson Corporation. Constant pressure dispensing system 100 includes a tank (or tanks) 102 that hold the material to be dispensed, which is a one-part adhesive or one-part sealant. As would be understood by one of ordinary skill in the art, a "one-part" adhesive or a "one-part" sealant includes both the hardener and the resin as part of the same composition as opposed to a two-part adhesive or two-part sealant where the hardener and resin are separate and then mixed together when the material is being applied. Each material supply tank 102 is fluidly coupled to an inlet 104 of a respective supply pump 106. An outlet 108 of each supply pump 106 is fluidly coupled to an inlet 110 of a flow meter 112. An outlet 114 of flow meter 112 is fluidly coupled to an inlet 116 of a controlled pressure regulator 118 and an outlet 120 of controlled pressure regulator 118 is coupled to an inlet 122 of a dispensing gun 124. An outlet 126 of an air pressure proportional valve 128 is fluidly coupled to an orifice size control inlet 130 of controlled pressure regulator 118. An air inlet 132 of air pressure proportional valve 128 is fluidly coupled to a source 134 of pressurized air. A controller 136 is configured to control constant pressure dispensing system 100, including controlling air pressure proportional valve 128 to set the size of an opening in the orifice (not shown) of controlled pressure regulator 118. In this regard, an output 138 of controller 136 is electrically coupled to an air pressure control input 140 of air pressure proportional valve 128 and an input 142 of controller 136 is electrically coupled to an output 144 of flow meter 112. Controller 136 also includes inputs/outputs 146 electrically coupled to other components of constant pressure dispensing system 100 in known manner.

Controller 136 controls controlled pressure regulator 118 in the following manner to set the size of the orifice opening in controlled pressure regulator 118. Based on a proportional valve control setting, either set in controller 136 or that controller 136 receives from another controller, controller 136 outputs an air pressure control signal to air pressure control input 140 of air pressure proportional valve 128. The air pressure control signal is illustratively an analog direct current voltage as air pressure control input 140 is illustratively an analog direct current voltage input as is known in the art, but could be other types of control signals such as a digital value if the air pressure proportional valve is configured to have digital control. The proportional valve setting for example ranges from 1% to 99% with 99% corresponding to a maximum opening size of the orifice of controlled pressure regulator 118. The analog direct current voltage control signal for example ranges from 0 volts direct current to 10 volts direct current with 0 volts direct current corresponding to 1% orifice opening size and 10 volts direct current corresponding to 99% orifice opening size. If for example the proportional valve control setting is 49 and the range is 0 volts direct current to 10 volts direct current, controller 136 outputs the analog voltage control signal at 4.9 volts direct current (49% of 10 volts direct current) to the air pressure control input 140 of air pressure proportional valve 128.

Air pressure proportional valve 128 provides pressurized air to orifice size control inlet 130 of controlled pressure regulator 118 at an air pressure that corresponds to the value of the air pressure control signal. For example, if the air pressure control signal is 4.9 volts direct current (corresponding to a 49% proportional valve control setting) and air pressure proportional valve has a range of 0 pounds per square inch to 90 pounds per square inch, air pressure proportional valve 128 provides pressurized air at a pressure of 44.1 (49%×90) pounds per square inch to orifice size control inlet 130 of controlled pressure regulator 118.

As is known, controlled pressure regulator 118 has a needle (not shown) that is urged by the air pressure at orifice size control inlet 130 from a closed position where it blocks the orifice of controlled pressure regulator 118 toward a full open position where it does not block this orifice. This varies a size of an opening size through the orifice of the controlled pressure regulator 118 depending on how much or how little the needle blocks the orifice. This opening size determines the flow rate of the material through the controlled pressure regulator and thus the volume of the material being dispensed during each shot.

The material flowing through the orifice of the controlled pressure regulator 118 exerts a force on the needle in a direction opposite the direction that the needle is urged by the air pressure at the orifice size control inlet 130. That is, the force exerted by the material flowing through the orifice urges the needle to its closed position whereas the air pressure at the orifice size control inlet 130 urges the needle to its open position. When the air pressure, material pressure, material viscosity and air pressure are all at nominal values, the actual volume of the material dispensed correlates with a desired volume. However, if any of these vary from nominal, the actual volume will vary. For example, if the pressure of material being dispensed is higher than nominal, this urges the needle to a more closed position resulting in less material being dispensed. If the pressure of material being dispensed is lower than nominal, this allows the needle to be urged to a more open position resulting in more material being dispensed. If the air pressure at the orifice size control inlet 130 of controlled pressure regulator 118 is less than nominal, this allows the needle to be urged to a more closed position by the force of material flow resulting in less material being dispensed. Conversely, if the air pressure at the orifice size control inlet 130 of controlled pressure regulator 118 is higher than nominal, this urges the needle to a more open position flow resulting in more material being dispensed. Variations in viscosity of the material being dispensed similarly affects the amount of material being dispensed. The needle meets more resistance from material flow when the material has a high viscosity, which forces the needle to a more closed position, than when the material has a low viscosity, allowing the needle to be urged to a more open position. Thus, as viscosity of the material being dispensed rises, the amount of material being dispensed falls and as the viscosity of the material falls, the amount of material being dispensed rises.

Heretofore, adjustments to the proportional valve control setting, and thus adjustments to the size of the orifice opening in controlled pressure regulator 118, have been made manually by a user when the constant pressure system determines that the volume of material dispensed during a shot is above a maximum limit or below a minimum limit. Controller 136, via flow meter 112, monitors the volume of material dispensed during each shot. If the volume of material dispensed during a shot exceeds the maximum limit or is less than the maximum limit, constant pressure dispensing system 100 stops and alerts the user whether the volume of material dispensed exceeded the maximum limit or was below the minimum limit. The user then changes the proportional valve control setting so that the volume of material being dispensed during shots will be brought back toward a desired volume.

In an example, the proportional valve control setting is 49, the desired volume of material to be dispensed during a shot (referred to herein as target volume) is 10.0 cm$^3$, and the maximum and minimum limits are +/−35% of the target volume. If the actual volume of material dispensed during the shot is above the maximum limit or below the minimum limit, the constant pressure dispensing system 100 alerts the user that the actual volume of material dispensed was higher than the maximum limit or lower than the minimum limit. The user then manually adjusts the proportional valve control setting by raising it if the volume of material dispensed was lower than the minimum limit or lowering it if the volume of material dispensed was higher than the maximum limit.

Disadvantages of the foregoing includes that due to variations in the pressure of material flow and viscosity of material that often occur due to environmental changes during a day, a number of manual interventions to adjust the volume of material being dispensed are often needed during a production shift with resultant down time. Also, to reduce the number of manual interventions, the maximum and minimum limits are typically set to provide a fairly high range to minimize manual interventions, resulting in the actual volume of material being dispensed from shot to shot varying to some appreciable degree from the target volume. Also, if the user does not adjust the proportional valve control setting in response to an alert, this can result in either too much or too little material being applied.

SUMMARY

In accordance with an aspect of the present disclosure, a method of controlling a volume of material dispensed by a constant pressure adhesive and sealant dispensing system during shots includes automatically adjusting a proportional valve control setting of a proportional valve of the dispensing system that applies an orifice size control pressure corresponding to the proportional valve control setting to an orifice size control inlet of a controlled pressure regulator. The method further includes monitoring with the controller a volume of the material dispensed during each shot; determining with the controller to adjust the proportional valve control setting when the volume of material dispensed during each shot of a predetermined number of successive shots is outside a target range; and upon determining to adjust the proportional valve control setting, the controller determining a new proportional valve control setting and then setting the proportional valve control setting to the new proportional valve control setting.

In an aspect, adjusting the proportional valve control setting of the proportional valve includes having the provide an output signal corresponding to the proportional valve control setting to an air pressure control input of the proportional valve from which pressurized air is provided to the orifice size control inlet.

In an aspect, determining the new proportional valve control setting includes: determining an error by the equation: error=abs(volume average−target volume)/target volume; when an average of the volumes of the predetermined number of successive shots is above the target volume, determining the new proportional valve control setting by the equation: new proportional valve control setting=proportional valve control setting−(proportional valve control setting×error×gain); and when an average of the volumes of the predetermined number of successive shots is below the target volume, determining the new proportional valve control setting by the equation: new proportional valve setting=proportional valve size setting+(proportional valve size setting×error×gain).

In an aspect in any of the foregoing aspects, the predetermined number of successive shots is three.

In an aspect in any of the foregoing aspects, the target range is +/−5% of a target volume.

BRIEF DESCRIPTION OF THE DRAWINGS

The present invention will become more fully understood from the detailed description and the accompanying drawings, wherein.

DETAILED DESCRIPTION

Figure 1:
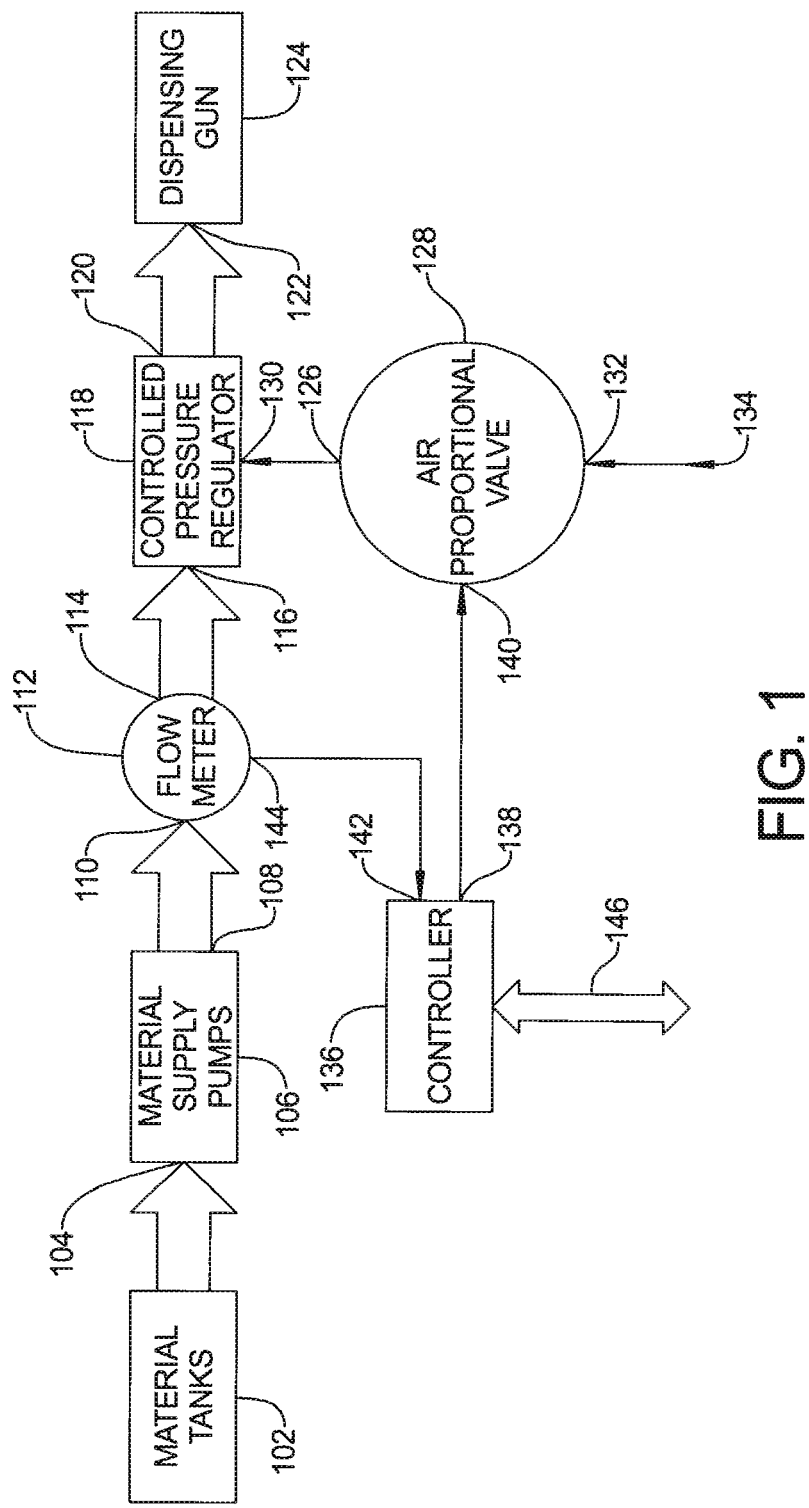
FIG. 1 is simplified block diagram of a prior art constant pressure dispensing system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Figure 2:
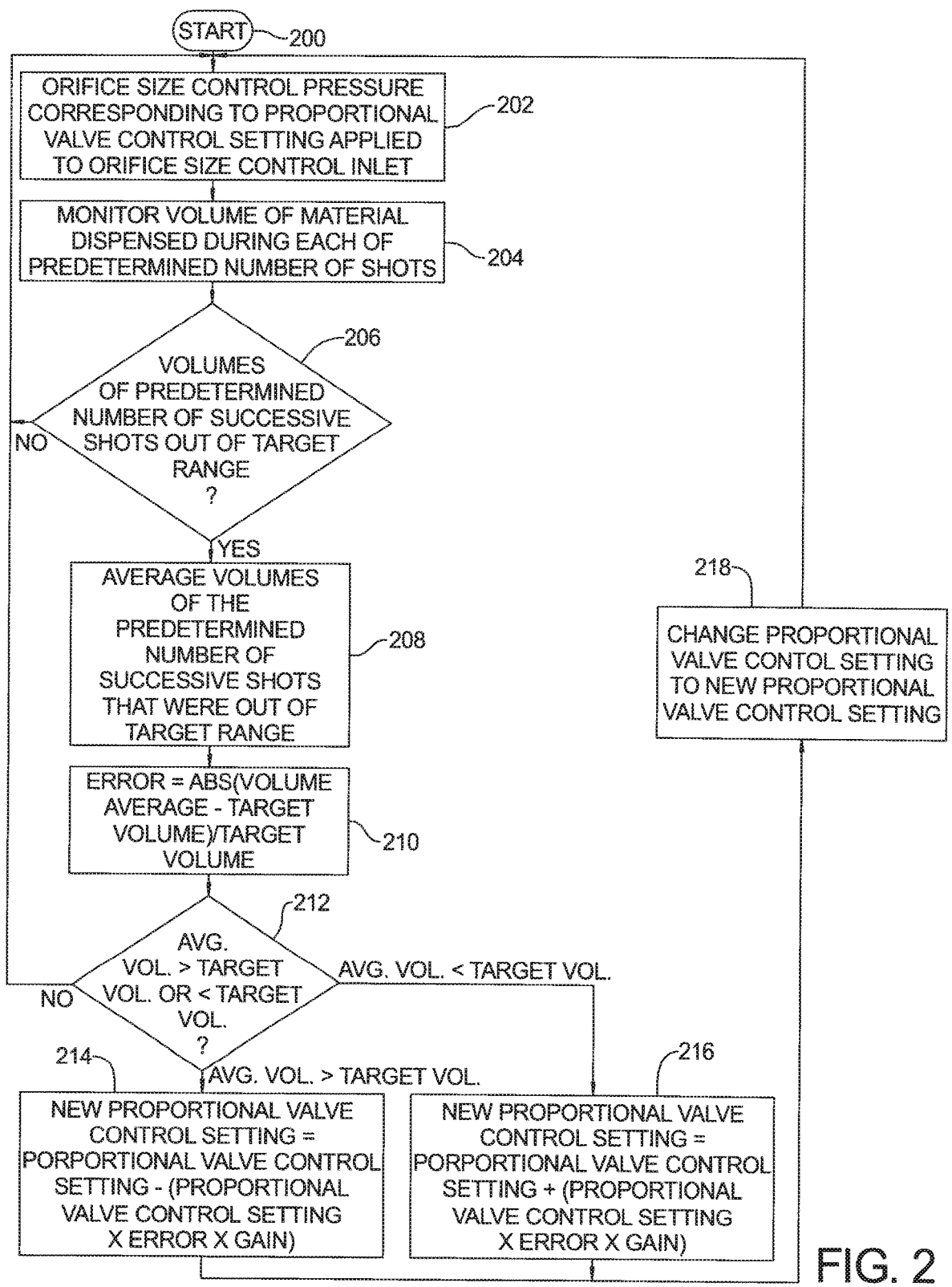
FIG. 2 is a flow chart of control logic for a routine in accordance with an aspect of the present disclosure for automatic adjustment of a proportional valve control setting in a constant pressure dispensing system.

FIG. 2 is a flow chart of control logic for a routine in accordance with an aspect of the present disclosure for controlling a volume of material dispensed in a constant pressure dispensing system, such as constant pressure dispensing system 100 shown in FIG. 1 and discussed above, by automatically adjusting a proportional valve control setting. While the routine of FIG. 2 is described with reference to the prior art constant pressure dispensing system 100 of FIG. 1, it should be understood that the routine of FIG. 2 is not prior art.

The routine starts at 200 and progresses to 202 where an orifice size control pressure corresponding to the proportional valve control setting is being applied to the orifice size control inlet 130 of the controlled pressure regulator 118 and proceeds to 204. Illustratively, the orifice size control pressure is pressurized air having a pressure corresponding to the proportional valve control setting. Illustratively, the controller provides an output signal corresponding to the proportional valve control setting to air pressure control input 140 of air pressure proportional valve 128 from which pressurized air at the orifice control pressure outlet 126 of air pressure proportional valve 126 is provided to the orifice size control inlet 130 of controlled pressure regulator 118. At 204, the routine monitors a volume of material dispensed during each shot. It then proceeds to 206 where it checks whether a volume of material dispensed during each of a predetermined number of successive shots is out of a target range. That is, whether volume of material dispensed is above a high target or below a low target. By way of example and not of limitations, the target range is +/−5% of a nominal target and the predetermined number of successive shots is three. It should be understood that the target range can be other than +/−5% and the predetermined number of successive shots can be other than three and in an aspect, either or both are calibratable values. If at 206 the routine found that there had not been the predetermined number of successive shots in which the volume of material dispensed during each shot was out of the target range, the routine determines that no adjustment of the proportional valve control setting is needed and returns to 202. If at 206 the routine found that there had been the predetermined number of successive shots in which the volume of material dispensed during each shot was out of the target range, the routine determines that the proportional valve control setting needs adjustment and proceeds to 208.

At 208, the routine averages the volumes of material dispensed during the predetermined number of successive shots that were out of the target range to obtain a volume average and proceeds to 210. At 210, the routine determines an error by the following equation: error=abs(volume average−target volume)/target volume, where abs is absolute value and target volume is a desired volume of material to be dispensed during a shot and is illustratively determined for the particular application and preset into the controller 136 such as during set-up of the constant pressure dispensing system 100 for the particular application. The routine then proceeds to 212 where it checks whether the average volume is greater than the target volume or less than the target volume. If the average volume is greater than the target volume, the routine proceeds to 214 where it calculates a new proportional valve control setting by the following equation: new proportional valve control setting=proportional valve control setting−(proportional valve control setting×error×gain). If the average volume is less than the target volume, the routine proceeds to 216 where it calculates a new proportional valve control setting by the following equation: new proportional valve control setting=proportional valve control setting+(proportional valve control setting×error×gain). Gain is a variable that limits how much adjustment can be made to the proportional valve control setting, and is illustratively a calibratable variable determined heuristically. It should be understood that the proportional valve control setting in the foregoing equations is the proportional valve control setting prior to adjustment. In an example, gain is 0.2 (20%). If at 212 the average volume was equal to the target volume, the routine determines that no change is to be made to the proportional valve control setting (as both the above equations for determining the new proportional valve control setting would result in the change being zero) and returns to 202. Otherwise, the routine proceeds to 218 where it sets the proportional valve control setting to the new proportional valve control setting and branches back to 202 where the orifice size control pressure corresponding to the proportional valve control setting, which has now been set to the new proportional valve control setting, is now being applied to the orifice size control inlet 130 of the controlled pressure regulator 118.

Controller 136 in which in which the above described routine of FIG. 2 is implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPU)), or application specific integrated circuit (ASIC). When it is stated that the controller or routine a function or is configured to perform a function, it should be understood that the controller is configured to do so with appropriate logic (such as in software, logic devices, or a combination thereof).

Table 1 below shows a comparison of over a one week period of average total volume and average proportional valve control setting of a constant pressure dispensing system 100 before and after implementation of the above described automatic compensation control in which a target volume was 1 cubic centimeter. The auto-compensations show the number of auto-compensations that the automatic proportional valve control setting compensation control made during this one week period.

TABLE 1

|  | Before | After |
| --- | --- | --- |
| Average Total Volume | 1.85 cc | 1.03 cc |
| Average Proportional Valve Control Setting | 40.00 | 52.42 |
| Auto-compensations | 0 | 82 |

Table 2 below shows a comparison of dispensed shots showing volumes with respect to high and low volume limits (+/−35% of target volume) of a constant pressure dispensing system 100 before and after implementation of the above described automatic proportional valve control setting compensation control in which a target volume was 1 cubic centimeter.

TABLE 2

|  | Before | After |
| --- | --- | --- |
| Sample Size | 7177 | 6449 |
| Number Above 35% of Target Volume | 6955 | 934 |
| Number Less than 35% of Target Volume | 2 | 12 |

TABLE 2-continued

| | Before | After |
|---|---|---|
| Total Within +/−35% Limits | 214 | 5503 |
| Total Out of +/−35% Limits | 6957 | 946 |
| % of Applications Within +/−35% Limits | 2.98% | 85.33% |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a volume of material dispensed by a constant pressure adhesive and sealant dispensing system during shots by automatically adjusting a proportional valve control setting of a proportional valve of the dispensing system that applies an orifice size control pressure corresponding to the proportional valve control setting to an orifice size control inlet of a controlled pressure regulator of the dispensing system, comprising:

monitoring with a controller a volume of the material dispensed during each shot;

determining with the controller to adjust the proportional valve control setting when the volume of material dispensed during each shot of a predetermined number of successive shots is outside a target range; and upon determining to adjust the proportional valve control setting, the controller determining a new proportional valve control setting and then setting the proportional valve control setting to the new proportional valve control setting, wherein determining the new proportional valve control setting includes determining an error by the equation:

error=abs(volume average−target volume)/target volume, where abs represents an absolute value, volume average represents an average of the volumes dispensed during each shot, and target volume represents a desired volume of material to be dispensed during a shot.

2. The method of claim 1 wherein adjusting the proportional valve control setting includes having the controller provide an output signal corresponding to the proportional valve control setting to an air pressure control input of the pressure proportional valve from which pressurized air is provided to the orifice size control inlet.

3. The method of claim 1 further comprising:

when an average of the volumes of the predetermined number of successive shots is above the target volume, determining the adjusted proportional valve control setting by the equation:

new proportional valve control setting=proportional valve control setting−(proportional valve control setting×error×gain), where gain is a variable that limits an amount of adjustment that is made to the proportional valve control setting; and when an average of the volumes of the predetermined number of successive shots is below the target volume, determining the new proportional valve control setting by the equation:

new proportional valve control setting=proportional valve control setting+(proportional valve control setting×error×gain), where gain is a variable that limits an amount of adjustment that is made to the proportional valve control setting.

4. The method of claim 3 wherein the target range is +/−5% of the target volume.

5. The method of claim 1 wherein the target range is +/−5% of the target volume.

6. The method of claim 1 wherein the predetermined number of successive shots is three.

* * * * *